United States Patent Office 3,535,207
Patented Oct. 20, 1970

3,535,207
METHOD OF CONVERTING HETEROCYCLIC BASES INTO THE CORRESPONDING NUCLEOSIDES BY BACTERIAL ACTION
Teruo Shiro, Yoshiteru Hirose, and Akira Kamimura Kanagawa-ken, Akio Yamanoi, Tokyo, and Koji Mitsugi, Kanagawa-ken, Japan, assignors to Ajinomoto Co., Inc., Tokyo, Japan
No Drawing. Continuation of application Ser. No. 625,003, Mar. 22, 1967. This application Aug. 19, 1969, Ser. No. 853,599
Int. Cl. C12d 13/06
U.S. Cl. 195—28     3 Claims

ABSTRACT OF THE DISCLOSURE

Certain synthetic derivatives of purine, hypoxanthine, guanine, adenine, xanthine, and imidazole, as well as purine, are converted to the corresponding ribonucleosides by cultures of mutant strains of *Bacillus subtilis* which are capable of producing inosine, xanthosine, 5-amino-4-imidazolecarboxamide riboside, or orotidine in a culture medium which contains a carbohydrate as the carbon source.

---

This application is a continuation of application Ser. No. 625,003 filed Mar. 22, 1967 and now abandoned.

BACKGROUND OF THE INVENTION

This invention relates to the conversion of certain heterocyclic organic bases to the corresponding ribonucleosides, and particularly to the conversion of such bases to the corresponding ribonucleosides by means of microorganisms.

It is known to convert suitable organic bases to the corresponding ribonucleosides by organic synthesis or by biochemical methods. The purely chemical methods of the organic chemist are so complex and costly as to be impractical on an industrial scale. The known biochemical methods rely on N-transglycosidation in which ribonucleotides or ribonucleosides are employed as ribose donors, making this method unsuited for large-scale industrial operation.

The principal object of the present invention is the provision of a biochemical method suitable for operation on an industrial scale which permits the conversion of synthetically produced organic bases to the corresponding ribonucleosides at relatively low cost.

SUMMARY OF THE INVENTION

We have found that a wide range of heterocyclic bases not directly available from natural sources are converted to the corresponding ribonucleosides by certain mutant strains of *Bacillus subtilis*. The conversion takes place in an otherwise conventional culture medium containing at least a carbon source, inorganic salts, and auxiliary nutrients necessary for the growth of microorganisms.

The strains of *Bacillus subtilis* which are suitable for the method of the invention are artificially induced mutants characterized by their ability of producing inosine, xanthosine, 5-amino-4-imidazolcarboxamide riboside, or orotidine from carbonhydrates. They include the strains No. 11404 (ATCC 13952) and No. B₄–Bₚ–11 (ATCC 13954) which produce inosine; No. SX–142 (ATCC 15042) which produces xanthosine; No. D–421 (ATCC 15116) which produces 5-amino-4-imidazolecarboxamide riboside; and No. 167 (ATCC 15181) which produces orotidine.

The heterocyclic bases which we have converted to the corresponding ribosides in good yields, and partly in excellent flields, are compounds of one of the following formulas:

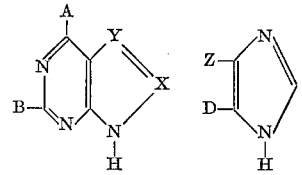

In these formulas, A may be hydrogen, hydroxyl, amino, chlorine, mercapto, methyl, methylmercapto, methoxy, ethoxy, acetamido, methylamino, dimethylamino, furfurylamino, or benzylamino.

B may be hydrogen, hydroxyl, amino, chlorine, methyl, ethyl, mercapto, methyl mercapto, methylamino, dimethylamino, acetamido, or morpholino.

Each of X and Y may be nitrogen or methylidyne.

Z may be amino, cyano, thiocarbamoyl, carboxy, carbamoyl, or formamido.

D may be amino, cyano, carboxy, formamido, carbamoyl, thiocarbamoylamino, or carbamoylamino.

Heterocyclic bases which have been converted successfully to the corresponding ribosides by the use of *Bacillus subtilis* include the following:

Purine
2-aminopurine
2,6-diaminopurine
6-methoxypurine
6-ethoxypurine
6-methoxy-2-chloropurine
6-methylthiorpurine
6-thio-2-oxypurine
2-chlorohypoxanthine
2-methylhypoxanthine
2-ethylhypoxanthine
2-methylthiohypoxanthine
2-thiohypoxanthine
2-morpholinohypoxanthine
N²-methylguanine
N²,N²-dimethylguanine
N²-acetylguanine
8-azaguanine
N⁶-furfuryladenine
N⁶-acetyladenine
N⁶-benzyladenine
2-methyladenine
2-oxy-N⁶-dimethyladenine
4-aminopyrazole-(3,4-d)-pyrimidine (the compound in which A=NH₂, B=H, X=N, Y=CH)
8-azaxanthine
4,5-diaminoimidazole
4-cyano-5-aminoimidazole
4,5-dicarboxyimidazole
4,5-dicyanoimidazole
5-amino-4-thiocarbamoylaminoimidazole
4-cyano-5-formylaminoimidazole
5-amino-4-carbamoylaminoimidazole The ribonucleosides obtained have the formulas:

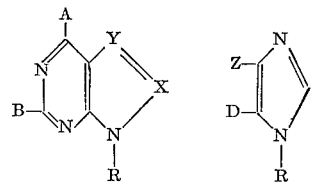

wherein A, B, X, Y, Z, and D are as defined above, and R is ribofuranosyl. Depending on the nature of the microorganisms employed, the culture medium may also contain inosine, xanthosine, orotidine, or 5-amino-4-imidazolecarboxamide riboside which are directly synthesized from a suitable carbon source. The formation of the last mentioned ribonucleosides can be avoided by suspending cells of the microorganism in a nutrient medium containing the afore-mentioned organic bases, a carbon source, inorganic salts, nutrients, but no other source of assimilable nitrogen.

The carbon sources which have been used successfully in the method of the invention include glucose, starch hydrolyzate, sucrose, or molasses. Ribose or a ribose donor are not required.

The organic base may be added to the culture medium either before or after inoculation with the microorganisms, but addition of the base should not be delayed more than 30 hours after inoculation if good yields are desired. The amount of the base may exceed its solubility in the culture medium, but preferably should not exceed 5 grams per liter of medium.

The conversion takes place to an adequate extent at temperature between 25 and 40° C., but a temperature of 30 to 34° C. should be maintained in most cases for good yields. The pH of the medium should be between 5 and 9, and a range of 5 to 7 is preferred. The mutant strains of *Bacillus subtilis* employed for the method of the invention are preferably cultured in media agitated by aeration but conversion of the afore-mentioned bases in static cultures is also possible.

The ribonucleosides present in the fermentation broths are readily detected and determined by their ultraviolet absorption bands, by paper chromatography, or by paper electrophoresis, as is conventioinal in this art.

The ribonucleosides are readily recovered from the fermentation broths by passing the broths over ion exchange resins, by adsorption on activated carbon, or by selective solvent extraction. The isolated materials are crystalline and may be identified by their infrared or ultraviolet spectra, by determination of their pentose content, by determining the Rf values of their paper chromatograms in various solvents, by paper electrophoresis, or by chemical analysis of their hydrolysates.

The ribonucleosides of the invention are useful intermediaries in the preparation of food flavoring compounds, such as 5'-inosinic acid or 5'-guanylic acid, and in the preparation of pharmaceuticals.

DESCRIPTION OF PREFERRED EMBODIMENTS

The following examples are further illustrative of this invention but it will be understood that the invention is not limited thereto.

EXAMPLE 1

20 ml. batches of a culture medium consisting of:

Adenine—300 mg.
Ammonium chloride—15 g.
$KH_2PO_4$—1 g.
$FeSO_4$—0.01 g.
$MgSO_4 \cdot 7H_2O$—0.4 g.
$MnSO_4$—0.01 g.
Soybean protein hydrolyzate—8 ml.
Starch acid hydrolyzate (glucose equivalent—80 g.
Histidine—150 mg.
Water—1 liter
pH 7 were placed in 500 ml. shaking flask and sterilized at 110° C. for ten minutes in an autoclave whereupon 25 g./l. $CaCO_3$, which had been sterilized separately, were added.

Each batch of culture medium was inoculated with *Bacillus subtilis* No. 11404 (ATCC 13952) and cultured at 30° C. for 70 hours. 2-chlorohypoxanthine was added to each batch at the time of inoculation or 24 hours later. The 2-chlorohypoxanthine was converted 100% to 2-chloroinosine in those batches in which the addition was made at the time of inoculation. The conversion rate was 90.2% in those batches in which the addition of 2-chlorohypoxanthine had been delayed. All batches contained inosine which had been produced from the glucose present.

EXAMPLE 2

*Bacillus subtilis* No. 11404 (ATCC 13952) and No. $B_4-B_{p11}$ (ATCC 13954) were cultured at 30° C. for 30 hours on respective batches of a sterile medium of Glucose—70 g.
$KH_2PO_4$—1 g.
Ammonium succinate—8 g.
$NH_4Cl$—7 g.
$MgSO_4 \cdot 7H_2O$—0.4 g.
Histidine—100 mg.
Adanine—300 mg.
Casein hydrolyzate—2 g.
$FeSO_4$—0.01 g.
$MnSO_4$—0.01 g.
Water—1 liter The bacterial cells were collected from the culture broths, washed twice with 0.9% potassium chloride solution, and suspended in the solution in such an amount that the turbidity of the suspensions was six times that of the original broth. One volume of each cell suspension was combined with five volumes of a mixture prepared from 42 g. glucose, 0.5 g. $MgSO_4 \cdot 7H_2O$, 1.2 g. $KH_2PO_4$, 10 g. $CaCO_3$, 1 liter water, and the amount of 2-chlorohypoxanthine listed in Table 1.

The fermentation mixtures so obtained were incubated at 30° C. for 22 hours with shaking and were then analyzed for 2-chloroinosine with the tabulated results.

TABLE 1

| | 2-chloroinosine formed by: | |
| --- | --- | --- |
| 2-Cl-hypoxanthine, g./l. | B. sub. ATCC 13952, percent | B. sub. ATCC 13954, percent |
| 0 | 0 | 0 |
| 1 | 100 | 98.5 |
| 2 | 80.5 | 61.2 |
| 4.5 | 53.5 | 48.3 |

EXAMPLE 3

Cell suspensions of *B. subtilis* (ATCC 13952) were combined with the amounts of organic bases listed in Table 2 in the manner described in Example 2, and the conversion of the bases to ribonucleosides was measured.

TABLE 2

Base: Conversion rate, percent
0.5 g./l. 6-methoxy-2-chloropurine _____ 100
2 g./l. 2-methylhypoxanthine _____ 90.2
0.25 g./l. 2-methylthiohypoxanthine _____ 100
0.5 g./l. $N^2$-methylguanine _____ 30
0.5 g./l. $N^2,N^2$-dimethylguanine _____ 100
1 g./l. 4-aminopyrazolo-(3,4-d)-pyrimidine ___ 100

EXAMPLE 4

Batches of the culture medium of Example 1 were combined with 1 g./l. of the organic bases listed in Table 3, and the mixtures were inoculated with *Bacillus subtillis* No. $B_4-B_p-11$ (ATCC 13954) and cultured at 30° C. for 68 hours with shaking. The conversion rate of the bases to the ribonucleosides is also listed in Table 3. Inosine was synthesized as a by-product.

TABLE 3

| Base | Conversion, g./l. | Yield, percent |
| --- | --- | --- |
| Purine | 0.7 | 34.2 |
| 2-aminopurine | 2.0 | 100 |
| 2,6-diaminopurine | 1.7 | 85.7 |
| 6-methoxy-2-chloropurine | 1.7 | 100 |

EXAMPLE 5

20 ml. batches of a culture medium prepared from 70 g. glucose
1 g. $KH_2PO_4$
15 g. $NH_4Cl$
0.3 g. yeast extract
0.4 g. $MgSO_4 \cdot 7H_2O$
0.01 g. $FeSO_4$
0.01 g. $MnSO_4$
12 ml. soybean protein hydrolyzate
25 g. calcium carbonate (separately sterilized)
0.15 g. adenine
1 liter water
pH 7 were mixed with enough 8-azaxanthine and 8-azaguanine respectively to make the concentration 1 g./l., and were inoculated with Bacillus subtilis B-422 (ATCC 15115). The mixtures were shaken for 75 hours at 34° C.

The ultimate concentration of 8-azaxanthine was 1.7 g./l. (97.6% yield), and that of 8-azaguanine 0.14 g./l. (11.3% yield).

EXAMPLE 6

Bacillus subtilis No. 11404 (ATCC 13952) was cultured on the medium described in Example 1 at 30° C. for 30 hours, and the cells were collected and suspended as described in Example 2. Portions of the suspension were combined with mixtures containing various organic bases in the manner of Example 2, and the corresponding ribosides were obtained in the amounts and yields indicated below after the name of each base so treated:

|  | G./l. | Percent |
|---|---|---|
| 6-methoxypurine | 1.6 | 85 |
| 6-methylthiopurine | 1.7 | 95 |
| N⁶-acetyladenine | 1.2 | 100 |
| 2-methylthio-6-oxypurine | 1.6 | 95 |

EXAMPLE 7

Reaction mixtures with regard to 2-chlorohypoxanthine of 2 g./l. in Example 2 were collected, bacterial cells were removed from one litre of the mixtures by centrifuge, and the pH of the clear solution obtained was adjusted to 9.0 with sodium hydroxide. The solution was introduced onto a column packed with an anion exchange resin (Dowex-1) of chloride form, the column was washed with 0.2N—$NH_4OH$, and inosine which was by-produced was eluted with 0.001N—HCl. Then, 2-chloroinosine was eluted with 0.003N—HCl, the fractions containing 2-chloroinosine was neutralized with sodium hydroxide, and concentrated under reduced pressure to give 1.2 g. of crude crystalline 2-chloroinosine. The crystals were recrystallized from water to form 0.8 g. of pure crystals, which melted at 128° C.

The crystals showed $\lambda_{max}$ 253 m$\mu$ at pH 1.0 and $\lambda_{max}$ 259 m$\mu$ at pH 11.0.

Similar and analogous results were obtained when other bases listed above were exposed to mutants of Bacillus subtilis capable of producing inosine, xanthosine, 5-amino-4-imidazolecarboxamide riboside, or orotidine from carbohydrates.

While the invention has been described with particular reference to specific embodiments, it is therefore to be understood that it is not limited thereto, but is to be construed broadly and restricted solely by the scope of the appended claims.

We claim:
1. A method of producing a riboside which comprises culturing a mutant strain of Bacillus subtilis on an aqueous medium containing a carbohydrate carbon source, inorganic salts, nutrients, and an organic base, and initially free from ribonucleosides and ribonucleotides,
   (1) said mutant strain being capable of producing inosine, xanthosine, 5-amino - 4 - imidazolecarboxamide riboside, or orotidine in a nutrient medium containing carbohydrate as the sole carbon source.
   (2) said organic base being a compound selected from the group consisting of purine, 2-aminopurine, 2,6-diaminopurine, 6-methoxypurine, 6-ethoxypurine, 6-methoxy-2-chloropurine, 6-methylthiopurine, 6-thio-2-oxypurine, 2-chlorohypoxanthine, 2-methylhypoxanthine, 2-ethylhypoxanthine, 2-methylthiohypoxanthine, 2-thiohypoxanthine, 2-morpholinohypoxanthine, $N^2$-methylguanine, $N^2,N^2$-dimethylguanine, $N^2$-acetylguanine, 8-azaguanine, $N^6$-furfuryladenine, $N^6$ - acetyladenine, $N^6$ - benzyladenine, 2-methyladenine, 2-oxy-$N^6$-dimethyladenine, 4-aminopyrazolo-(3,4-d)-pyrimidine, 8-azaxanthine, 4,5-diaminoimidazole, 4-cyano-5-aminoimidazole, 4,5-dicarboxyimidazole, 4,5-dicyanoimidazole, 5-amino - 4 - thiocarbamoylaminoimidazole, and 4 - cyano-5-formylaminoimidazole, and
   (3) recovering the riboside of said organic base so produced from said aqueous medium.

2. A method as set forth in claim 1, wherein said medium additionally contains a source of introgen.

3. A method as set forth in claim 1, wherein said mutant strain is a member of the group of strains having ATCC numbers 13952, 13954, 15042, 15115, 15181, and 15116.

References Cited
UNITED STATES PATENTS

| 3,111,459 | 11/1963 | Motozaki et al. |
| 3,135,666 | 6/1964 | Hara et al. |
| 3,258,408 | 6/1966 | Okumura et al. |
| 3,269,917 | 8/1966 | Imada et al. |

ALVIN E. TANENHOLTZ, Primary Examiner

U.S. Cl. X.R.
260—211.5